April 30, 1935.   F. G. NICKERSON   1,999,471
MOTOR VEHICLE SENTINEL
Filed July 19, 1933

Inventor.
Franklin G. Nickerson.

Patented Apr. 30, 1935

1,999,471

UNITED STATES PATENT OFFICE 1,999,471

MOTOR VEHICLE SENTINEL

Franklin G. Nickerson, Attleboro, Mass.

Application July 19, 1933, Serial No. 681,116

3 Claims. (Cl. 40—68)

This invention relates to an indicator in which is comprised a series of independently rotatable wheels carrying on their peripheries digits any selected combination of which may be exposed to view through an aperture in the case wherein the wheels are mounted.

More particularly, the invention relates to the means for locking the wheels against accidental or casual movement from a given position of adjustment. This device may be used to remind the operator of a motor vehicle, the proper mileages at which to lubricate, and, in conjunction with the speedometer, to aid the operator to ascertain the average mileage obtained per gallon of gasoline used, whereby to keep check on the car's condition.

A suggestive embodiment of this invention is set forth in the accompanying drawing, in the following manner.

Figure 5:
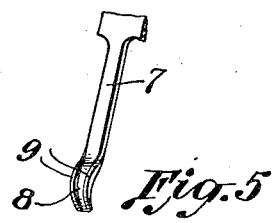

Fig. 5 which is an enlarged detail view in section, shows the form of the spring tongue end.

The present device consists of a ribbed back plate (1) to which are attached four posts (2) extending between which are two pins (3) whereon is rotatably mounted a series of wheels (4) each provided with a disk (5) which is connected thereto upon one face.

The disks which are of greater diameter than the wheels are, by preference, scalloped at (6) for a fourfold purpose, to facilitate turning movement thereof by the fingers, to increase visibility of the digits on wheel (4) to receive engagement from a spring tongue (7) and to co-act with said spring tongue when a sufficient rotary force is applied to the disk to carry the high point of scallop past the contact point with spring tongue, whereby movement of the disk is prolonged until contact point of spring tongue rests at juncture of the next scallop.

The spring tongue end is formed as shown at Fig. 5 having a raised surface (8) between two side walls (9). The side walls serve the double purpose of adding strength, and, retaining the disk in proper relation to the spring tongue.

The spring tongue (7) extends from a plate which is provided with a plurality of such tongues, one for each disk, each tongue will co-act independently with its associated disk, and permit said disk to rotate in either direction upon application of a rotary force which is sufficient to overcome the tension of the tongue.

The spring plate is provided with bosses (10) which secure it in place by engagement with holes in the rib of the back plate (1).

The front of the case (11) is apertured at (12) adjacent the several wheels and disks so as to expose the forward portion of their peripheries.

Inasmuch as the disks are the larger, the aperture is slotted at (13) on opposite edges to accommodate the disks.

Upon each wheel is carried, marked, or impressed a series of digits, from 0 to 9 by preference, any one of which may be moved into register with the aperture (12), such a position being determined when the tongue (7) is at the juncture of two scallops.

While the accompanying drawing shows four groups of five wheels each and four locks, I do not limit myself to any particular grouping, such being a matter of preference.

By the means described, the several wheels, through the medium of the manipulating disks, may be moved into any selective rotative positions so as to set up for exposure a desired combination of digits.

Figure 1:
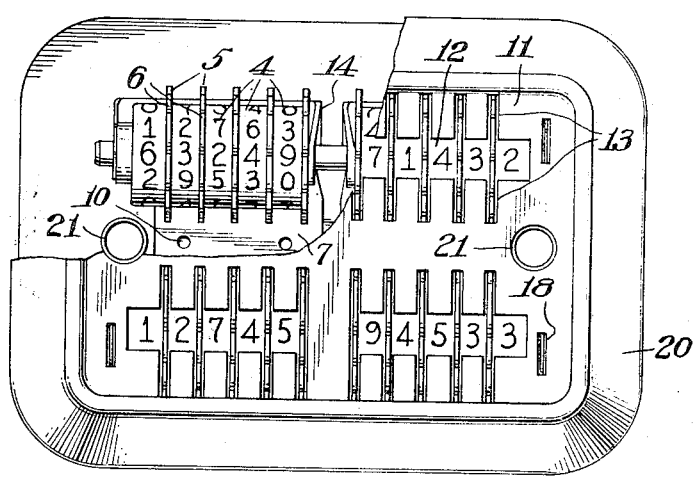
Fig. 1 is a front elevation of the device in its entirety a part of the case being broken away.
Figure 2:
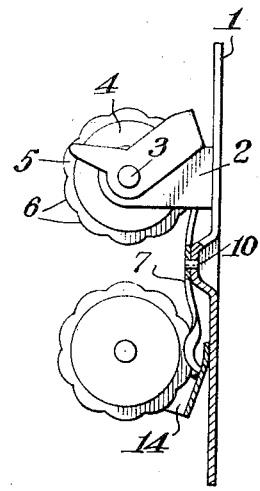
Fig. 2 is an end elevation thereof, with cover or case (20) one post (2) and bushings (21), omitted, and operating arm of lock (17) and part of back plate (1) cut away to show the lock holding spring when in locking position, and boss on spring seated in hole in rib.
Figure 3:
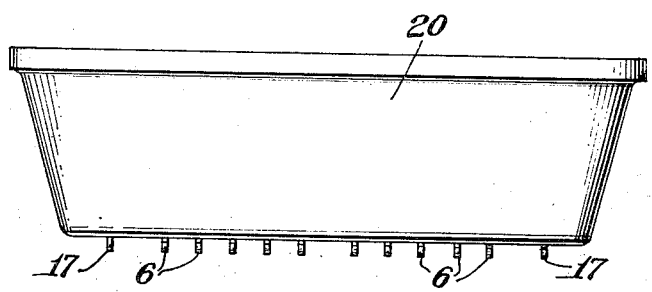
Fig. 3 is a plan view thereof.
Figure 4:
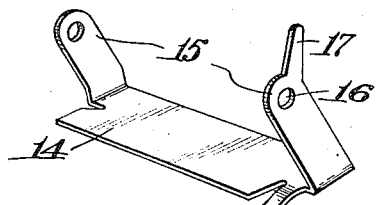
Fig. 4 is a perspective view of the lock.

In order to safeguard against accidental or casual disturbance of any number combination so set up, I provide for each series of wheels a lock, Fig. 4, which is positive in its action.

This lock, which may be formed from sheet metal, consists of a shelf (14) from which two arms (15) upstand, both arms being provided with holes (16) whereby the lock is pivotably mounted on the pin (3).

When the lock is so mounted, its arms embrace under tension, both the series of wheels it is to lock, and a post, (2) thus keeping the wheels quietly in place.

From the end of one arm projects an ear (17) which, extending thru a slot (18) provided for it in the case (20) acts as an operating lever.

From one corner of the shelf (14) extends a flexible tongue (19) of such length, that, when lock is being pivoted into locking position, it slides on back plate, flexing, as it passes the minimum distance from pin to plate and on continued movement, straightening, thereby frictionally holding lock in locking position. The lock thus held, forms a shelf under the spring tongues, thus locking said tongues and by means of them, locking the disks against rotation.

The case (20) may be held to the back plate (1) by two hollow spacing bushings (21) used as hollow rivets, through which, fastening screws may be used to hold the device in any convenient place, such for instance, as alongside the mirror over the windshield.

From the preceding description, it will be manifest that the present invention is advantageous because of the simplicity of its construction and operation, the fewness of its parts and the positive character of the locks which act upon the springs.

I desire in accordance with the terms of the claims following to be protected in this invention whether or not the embodiment thereof be as illustrated and described, or modified therefrom without sacrifice of the features which impart novelty thereto.

I claim:

1. In an indicator, the combination of a series of independently rotatable wheels having a coaxial mounting, a scalloped or serrated disk associated with each wheel and connected thereto, spring means to engage with said disk and a pivotably mounted locking means whereby the spring means may be held, or allowed to operate, at will, thus locking or unlocking the wheels.

2. In an indicator, the combination of a series of independently rotatable, scalloped or serrated flanged wheels having a coaxial mounting, a multiple fingered spring, each finger having near its end a raised surface between side walls, and pivotable locking means whereby the raised surfaces of the spring fingers may be held in locking contact with the scalloped flange of the wheels.

3. In an indicator, the combination of a series of independently rotatable, scalloped or serrated flanged wheels having a coaxial mounting, spring means to engage with said wheels and a pivotably mounted locking means consisting of a swinging shelf with a flexible friction tongue, and operating means, whereby the spring means may be held or allowed to operate, at will, thus locking or unlocking the wheels.

FRANKLIN G. NICKERSON. [L. S.]